(12) United States Patent
Lavazais et al.

(10) Patent No.: US 11,940,357 B2
(45) Date of Patent: Mar. 26, 2024

(54) SYSTEM FOR PREDICTING ANOMALIES OF MACHINING

(71) Applicant: GF Machining Solutions SA, Meyrin (CH)

(72) Inventors: Bertrand Lavazais, Thoiry (FR); Roberto Perez, Geneva (CH)

(73) Assignee: GF Machining Solutions SA (CH)

( * ) Notice: Subject to any disclaimer, the term of this patent is extended or adjusted under 35 U.S.C. 154(b) by 254 days.

(21) Appl. No.: 17/398,130

(22) Filed: Aug. 10, 2021

(65) Prior Publication Data
US 2022/0050023 A1    Feb. 17, 2022

(30) Foreign Application Priority Data
Aug. 11, 2020   (EP) ..................... 20190463

(51) Int. Cl.
| | |
|---|---|
| *G06F 11/30* | (2006.01) |
| *G01M 99/00* | (2011.01) |
| *G06N 3/04* | (2023.01) |
| *G06N 5/022* | (2023.01) |

(52) U.S. Cl.
CPC ............ *G01M 99/005* (2013.01); *G06N 3/04* (2013.01); *G06N 5/022* (2013.01)

(58) Field of Classification Search
CPC .................................................. G01M 99/005
See application file for complete search history.

(56) References Cited

U.S. PATENT DOCUMENTS

| | | | |
|---|---|---|---|
| 2017/0337469 A1* | 11/2017 | Debes | .......... G06N 3/04 |
| 2019/0152011 A1 | 5/2019 | Kummari et al. | |

FOREIGN PATENT DOCUMENTS

| | | | |
|---|---|---|---|
| KR | 20190108515 A | * | 3/2019 |
| KR | 2019018515 A | | 9/2019 |

OTHER PUBLICATIONS

Extended European Search Report dated Feb. 5, 2021 for Application No. 20190463.8 (13 pages).

\* cited by examiner

*Primary Examiner* — Phuong Huynh
(74) *Attorney, Agent, or Firm* — Harness, Dickey & Pierce, P.L.C.

(57) ABSTRACT

A system (1) for predicting anomalies of machining, in particular the anomalies generating a defect on a part machined by a machine tool, comprising:

a. a signal-processing unit (10) configured to acquire raw data, in particular sensor data and machining parameters from a machine tool (2) and to process the raw data to neuromorphic-circuit input data including features extracted by the signal-processing unit;

b. a neuromorphic circuit (20) connected to the signal-processing unit configured to build a neural network on an integrated circuit, wherein the neural network is trained by training data and the trained neural network enables to determine anomaly data describing anomalies of the machining in response to the neuromorphic-circuit input data, in particular to the features; and c. a controller configured to receive the determined anomaly data from the signal-processing unit and to determine at least one action, which can be taken to overcome the determined anomalies.

15 Claims, 5 Drawing Sheets

| defects | | Raw data |
|---|---|---|
| Classification | Picture | |
| Short Line | | Contamination Ratio |
| Large Strip | | Mean Voltage<br>TD Ratio<br>Lower Head Inj. Pressure |

Fig. 4

SYSTEM FOR PREDICTING ANOMALIES OF MACHINING

CROSS-REFERENCE TO RELATED APPLICATIONS

This application claims priority to European Application No. 20190463.8 filed Aug. 11, 2020, which is hereby incorporated by reference in its entirety.

BACKGROUND OF THE INVENTION

Technical Field

The present invention relates to a system for predicting anomalies of machining, in particular, anomalies causing a defect on a part machined by a machine tool. Additionally, the present invention is related to a method for predicting anomalies of machining.

Discussion

The quality control of the produced parts and maintaining the repeatability of the produced parts can be challenging for the manufactures, because it is a time and resource-consuming task. Therefore, some manufactures use expensive materials to prevent any defect.

Until now, the known methods can only provide process quality feedback until visual inspection and metrology controls have been accomplished, which can be conducted merely after the complete production of the part. If any anomalies are detected at this stage, it is in most cases too late to keep the damage as low as possible, since a large amount of parts have been produced by a machine tool with improper machining parameters. Therefore, production cost can be reduced and production efficiency can be enhanced, if the anomalies of the produced part can be detected in an early stage of the process, for example during the machining, because the machining parameters can be adjusted in time if correction is necessary. Consequently, the damage caused by the anomaly can be dramatically reduced.

Further disadvantages of known methods are time consuming and requiring trained experts and precision instruments. In the known methods, metrology instruments are applied, for example roughness measurement with a touch probe, optical surface scanning, etc. The main difficulty is to be able to conduct such measurements without slicing the produced part. Thus, such measurements are normally only accomplished on a portion of the part to reduce the cost. However, the precision of the quality control is adversely affected.

Moreover, it is difficult to maintain the repeatability of the quality. For the visual inspection, a controller uses a touch probe to detect fluctuation along the surface of the machined part. The susceptibility depends on the experience of the controller and is difficult ensure the reproducibility.

In the recent years, machining learning is widely used for prediction. EP 3 326 749 is directed to a method for machining of workpieces and inspection of the processed workpiece surface in a machine tool. An image is captured in situ meaning on the machine tool during a machining process interruption. The surfaced characteristics are evaluated by means of a previously trained pattern recognition algorithm.

However, most of machining learning method runs on standard computers, which suffer from several limitations. They deal with processing and memory separately. They execute on instruction at a time. Even architectures based on multiple processors require synchronization schemes and cache management, which can cause a barrier. Therefore, a neural network implemented by software and running on computers have the limitations to achieve real parallelisms.

SUMMARY OF THE INVENTION

It is an aspect of this invention to provide a system for predicting anomalies of the machining in real time. It is a further aspect of the invention to provide a system for predicting anomalies of the machining related to defects on a part machined by a machine tool during the machining in real time.

According to the preferred embodiment of the present invention, these aspects are achieved through the features of independent claims. In addition, further advantageous embodiments follow from the dependent claims and the description.

According to an aspect of the present invention, a system for predicting anomalies of machining comprises a signal-processing unit, a neuromorphic circuit connected to the signal-processing unit and a controller. The signal-processing unit is configured to acquire raw data, in particular sensor data and machining parameters from a machine tool and to process the raw data to neuromorphic-circuit input data including feature extraction. The neuromorphic circuit is configured to build neural networks by integrating a plurality of neuron operators in an integrated circuit and to use the neural network to determine anomalies, which can cause defects on the part machined by the machine tool, and/or relates to defects of the machine tool during machining. The controller is configured to receive the determined anomalies from the signal-processing unit and to determine at least one action, which can be taken to overcome the detected anomalies. This system is able to detect anomalies in real time to predict and prevent still avoidable defects occurred on the machined part.

The system using edge based machine learning is advantageously designed to detect the anomalies in real-time, namely having an extremely low latency compare to the machining time. The time from acquiring the raw data from the machine tool to receive the determined anomalies by the controller is in the range of 1 to 100 ms.

The anomalies are predicted by the system before a defect on a part is happened, such that the defect can be prevented.

Machine tools are capable of providing hundreds of raw signals sampled in a high frequency. The raw data related to the machining conditions can be acquired in every milliseconds. A first type of raw data is related to machining parameters set to machine the part. If the system is utilized for electro-discharge machining, the machining parameters may be e.g. position of axes of the machine, timing sequence for sparks generation, position tightness of machining servo control, wire feeding speed and tension. If the system is utilized for milling, the machining parameters may be e.g. the feedrate and rotation speed of the spindle, allowed spindle torque. A second type of raw data represent the values of sensor signals measured by a plurality of sensors mounted in the machine tool, for example, temperature sensors for measuring the temperature of the machine elements and the parts, optical sensors for capturing the optical images of the part under machining, or wire-current sensor for evaluating the occurrences of the spark for EDM, pressure sensor for measuring the pressure in the lower head of EDM machine, sensors for detecting the vibration in milling machine.

The raw data input into the signal-processing unit must be selected to filter out the improper data, the noise, and redundant data not required for anomaly prediction to improve the accuracy of the prediction and to reduce the data amount to be processed by the neuromorphic circuit. Moreover, the raw data is pre-selected by the signal-processing unit in a manner such that only the data required to determine the anomalies for a specific machine tool and/or a specific machining process is adapted into the applicable format as neuromorphic-circuit input data. The flexibility of the system can be improved, because the signal-processing unit is able to select different machining data for a specific machining type or parts to be produced. The system can be utilized for different types of machine tools, such as, for electrical discharge machine, for milling, for laser machining and for additive manufacturing.

Additionally, the raw data must be converted to the proper data format to be fed into the neuromorphic circuit. Features are required as neuromorphic-circuit input data. For training the neuromorphic circuit, a plurality of training data sets are provided and fed into the neuromorphic circuit such that the neuromorphic circuit can learn the association between the features and the anomalies. Each training data set includes a plurality of features and a corresponding anomaly. Once the neuromorphic circuit is trained, the contents of the neurons can represent a knowledge space. The set of trained neurons constitute a knowledge space.

Feature extraction is accomplished by the signal-processing circuit. In order to extract the features, a subset of signals included in the raw data is selected. In further, statistical calculations of the selected signals are performed including calculating average, standard deviation, variance, percentiles distribution. Additionally, the calculated signals can be mixed together to generate new composite signals, which are normalized to fit the digital input value ranges of the neuromorphic circuit. For example, the raw data is axis positions of an EDM machine. Firstly, the signal-processing unit calculates the error by subtracting a reference signal from the measurement signal. Then the variance for 5 ms time window is calculated. In addition, the variance is multiplied with another raw data machining speed signal. Finally, the normalize values of the multiplication result is determined to fit range of integer values from 0 to 1023. The normalized values are neuromorphic-circuit input data. In this example, the whole process from transmitting the raw data from the machine tool to receiving the determined anomalies by the machine tool takes about 7 ms.

Advantageously, the signal-processing unit is configured to communicate the predicted anomalies to the controller to adjust the machining parameters and/or to indicate an error. In a preferred variant, the controller is integrated in the machine tool. Advantageously, the controller is the numerical controller of the machine tool.

The signal-processing unit can be implemented as software or hardware or combination of both. In one preferred variant, the signal-processing unit is built on an electronic circuit board. At least a part of the function of signal-processing unit, e.g. communication decoder to obtain raw data and normalization of the signal is implemented by using Field Programmable Gate Array.

In order to ensure the adaptability of the system, the signal-processing unit is configured to be able to select from the raw data different combinations of data required to determine the anomalies related to different types of machining and/or for different parts to be produced.

A fast communication between the machine tool and the signal-processing unit for transmitting the raw data therebetween is important to ensure the real-time anomaly detection. Preferably, internal real-time network, namely field bus or 5G is chosen.

The neuromorphic circuit included in the system enables a real-time identification of anomalies and control of deviations, is autonomous and ensures repeatability. The neuromorphic circuit includes hardware accelerated neuromorphic neural network to classify and identify the anomalies and is able to react with latency under one millisecond. The neuromorphic circuit is an integrated circuit, which can be packaged in the same housing as the signal-processing unit to ensure the fast communication. In one advantageous variant, the signal-processing unit and the neuromorphic circuit are arranged on the same printed-circuit board. The signal-processing unit and neuromorphic circuit can be located in the proximity of the machine tool, preferably in the machine tool to enhance the speed of the communication for obtaining raw data.

Additionally, the signal-processing unit returns a set of signals to quantify the anomalies defined as anomaly data, which may relate to the machined part and/or to the machine tool. The anomaly data indicate type of defects, location of defects on the produced part, and confidence level defining the certainty of the prediction results. The type of defects related to the part can be surface quality of the part, accuracy of the dimension of the part, and dispersion of quality when part is fixed differently on the machine. The anomalies related to the machine tool can be one of the following: failure of a machine element, tool wear, EDM wire electrical contacts wear, machine axis greasing maintenance, vibration between milling tool and workpiece. Since the system can be utilized for different types of machining, the anomalies to be detected depend on the application. Therefore, the system can provide means to the user to trace any potential damage on the part under machining and to the machine numeric command to anticipate and avoid such defect by adjusting the machining parameter. Comparing to the traditional neural network using for example graphics processing units, the neuromorphic circuit provides a massive parallelism, thereby the anomalies can be determined in a real-time. Since the anomalies are sent back to the controller with a very small latency, the machine tool is able to react in real time thanks to the information provided thereto.

The neuromorphic circuit provides the operation to run the algorithmic of machine learning such as redial basis function network on an integrated circuit. Before the neuromorphic circuit is applied to detect the anomalies, the neural network of the neuromorphic circuit is trained by using training data. The training data can be experimental data obtained from the machining of the part including sensor signals, machine parameters. It is also considerable to use simulated data as training data. After the training phase, the contents saved in the neuromorphic circuit builds a knowledge space, in which different anomalies are associated to the features as the input of the neuromorphic circuit. Alternatively, a knowledge space can also be directly loaded into the neuromorphic circuit, e.g. as part of an image file. The image file includes signal processing description for features extraction to store on the signal processing unit and associated knowledge space to store on the neuromorphic circuit. If the neuromorphic circuit provides a large capacity, several knowledge spaces can be stored. The neuromorphic input data includes the features extracted from the raw data and the output of the neuromorphic circuit includes the anomaly data.

The neuromorphic circuit may be a single silicon chip. In further, the neuromorphic circuit is configured to build a neural network having a parallel architecture. The neural network comprises a chain of identical elements, namely neurons, which can store and process information simultaneously. The neurons can be addressed in parallel and are configured to recognize the same input pattern in parallel. In another variant, a plurality of neuromorphic circuits are applied to expand the size of the neural network, in particular, a plurality of neuromorphic circuits are cascaded. The circuits either share the same root of features as input, or cascaded to create multi-layered neural network.

In some embodiments, an edge module is provided and configured to receive raw data and/or anomaly data from the signal-processing unit. The edge module comprises a data acquisition client and a storage module. The data acquisition client is configured to directly communicate with the signal-processing unit and/or with the machine tool. The data acquired by the data acquisition client is defined as status data and can be stored in the storage module.

The status data includes at least one of the following: data related to the machining parameters of the machine tool, predicted anomalies and adjusted machining parameters.

In one embodiment, the system is designed to be autonomous. In this case, the storage module is also accessible by an analytic unit. The status data is retained in the edge module for long-term purposes.

In some embodiments, it is possible to allow a cloud service and/or a server and/or communication devices to communicate with the edge module to obtain the data stored in the storage of the edge module for archiving, e.g. on cloud services and/or further analyzing the retrieved data.

The edge module further comprises a firmware update manager, which is configured to update the signal-processing unit, for example update the communications, upgrade calculations libraries. In further, the firmware update manager is configured to update the knowledge space stored in the neuromorphic circuit based on new information related to the features and anomalies dependency.

For a specific application, the signal-processing unit is able to detect the type of the machine tool and to select the appropriate data from the raw data according to a pre-defined rule and extract the suitable features to be fed into the neuromorphic circuit to detect the anomalies for this type of machine tool. The type of machine tool can be considered as different type of machining, e.g. laser machining, EDM, milling, additive or different machine tools within the same type of machining, e.g. machine tool for high-speed milling, machine tool for high-precision milling.

The structure of the neuromorphic circuit maintain the same for different applications. Different knowledge spaces must be provided for different applications. Signal processing unit is adaptable for a custom machining application, and required neuromorphic knowledge spaces can be changed accordingly to optimize prediction. It is considerable to store different knowledge spaces associated to different applications. Among the features provided to the neuromorphic circuit, one or more signals can be generated to select the corresponding knowledge space.

Advantageously, an analytic unit is included in the edge module and configured to receive quality data to generate optimized training data and consequently an improved knowledge space. This enables the custom to teach the system what and how learn anomalies for his specific application. The system is able to learn new anomalies and refine its knowledge space with practice by using the optimized training data. The precision of the prediction can be further optimized. The optimized training data can be sent to the neuromorphic circuit to run the training again or the improved knowledge space can be directly loaded into the neuromorphic circuit updated by using firmware update manager.

In one variant, the part quality data is obtained by inspecting machined part using quality control means, preferably, an optical device. Quality data can be derived after the machining, e.g, from geometric comparison of the machined part, or local roughness measurement. The analytic tool is configured to obtain the quality data such that the customer can add and/or correct anomalies, e.g. defining exact location of the anomalies on the part.

A new anomaly helps to refine expected feedback of machine good behavior, namely neuromorphic knowledge space of normal operation. In further, the new anomaly can be correlated to its features provided by the signal-processing unit, and labelled to expend the neuromorphic anomaly knowledge space.

Alternatively, the analytic application unit can be implemented in the signal-processing unit.

If the edge device is connected to the cloud services, the storage module is configured to have data retention policies for a defined time period, then the status data is pushed to the cloud because analytics can be accomplished in the cloud. Through the cloud database a plurality of sources of quality measurement can be used to optimize the anomaly detections. A full history of the part manufacturing is accessible to either investigate issues detected on later operations done on a particular part, or predict issues on planned operations. It is advantageous for a customer producing large series of the same operation on machines working in parallel. The benefit of comparing similar parts quality, then identify a machine deviation will deeply increase performance of the system.

In one embodiment, the anomaly data can be presented on a display in real time, in particular, on the display of the machine tool.

In the present invention, a method for predicting anomalies of machining comprises the following steps: acquiring raw data, in particular sensor data and machining parameters from a machine tool and processing the raw data to neuromorphic-circuit input data by reducing the amount of data and extracting features; determining anomaly data related to defects on a part, which is being machined by the machine tool, and/or the defects of the machine tool during operation by a neuromorphic circuit connected to the signal-processing unit and is configured to build a neural network by integrating a plurality of neuron operators in the neuromorphic circuit; and sending the determined anomaly data by the signal-processing circuit to the machine tool such that at least one action can be taken to reduce the determined anomalies.

In a preferred embodiment, the method further comprises: starting machining and performing the anomaly detection; inspecting the part after the machining to generate quality data of the machined part; comparing the generated quality data with the anomaly data generated during the machining; and generating optimized training data to train the neuromorphic circuit.

BRIEF DESCRIPTION OF THE DRAWINGS

In order to describe the manner in which advantages and features of the disclosure can be obtained, in the following a more particular description of the principles briefly described above will be rendered by reference to specific embodiments thereof, which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which:

FIG. 4 Illustrates one example of anomaly detection for EDM application.

DESCRIPTION OF THE PREFERRED EMBODIMENTS

Figure 1:
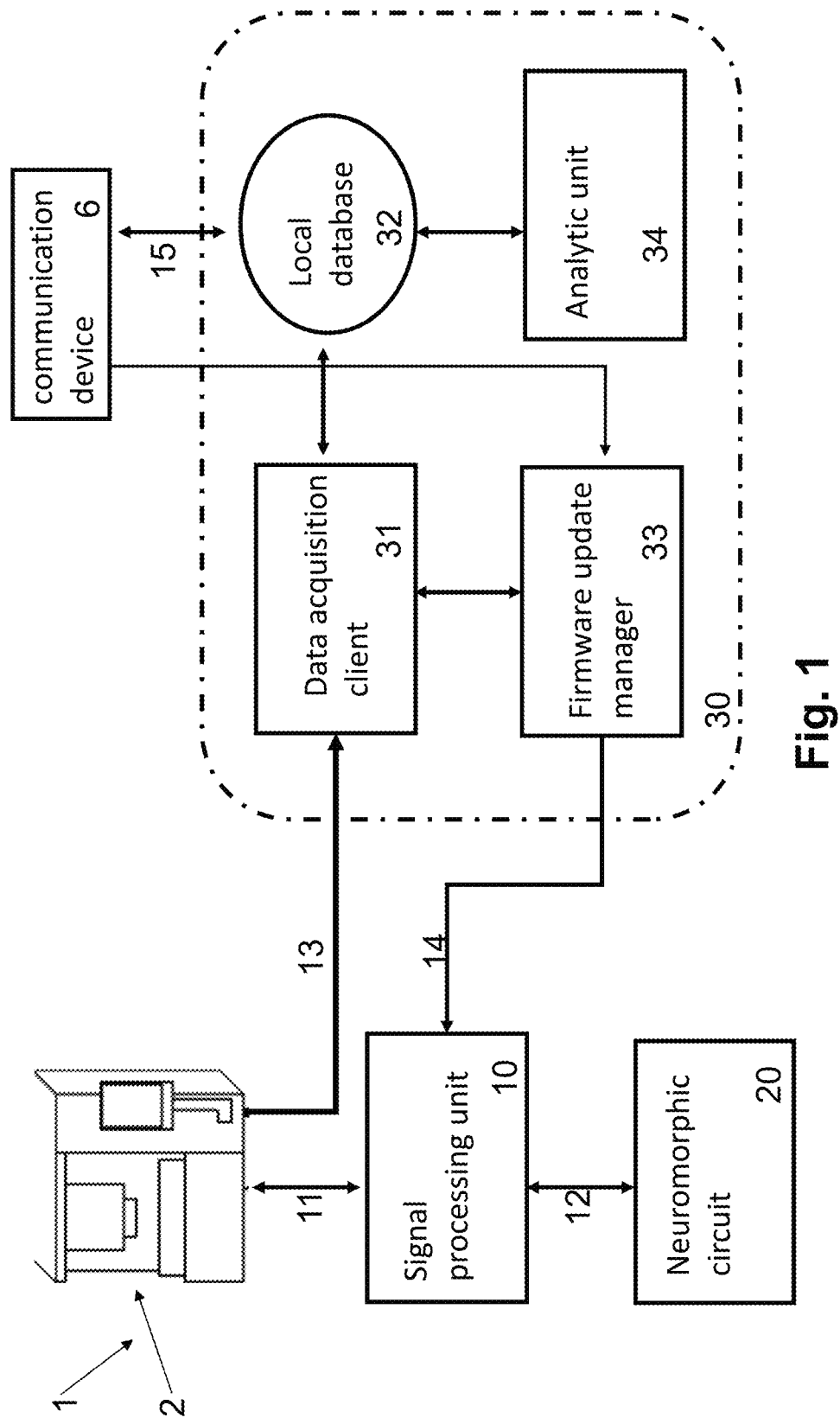
FIG. 1 illustrates a first embodiment of the system.
Figure 2:
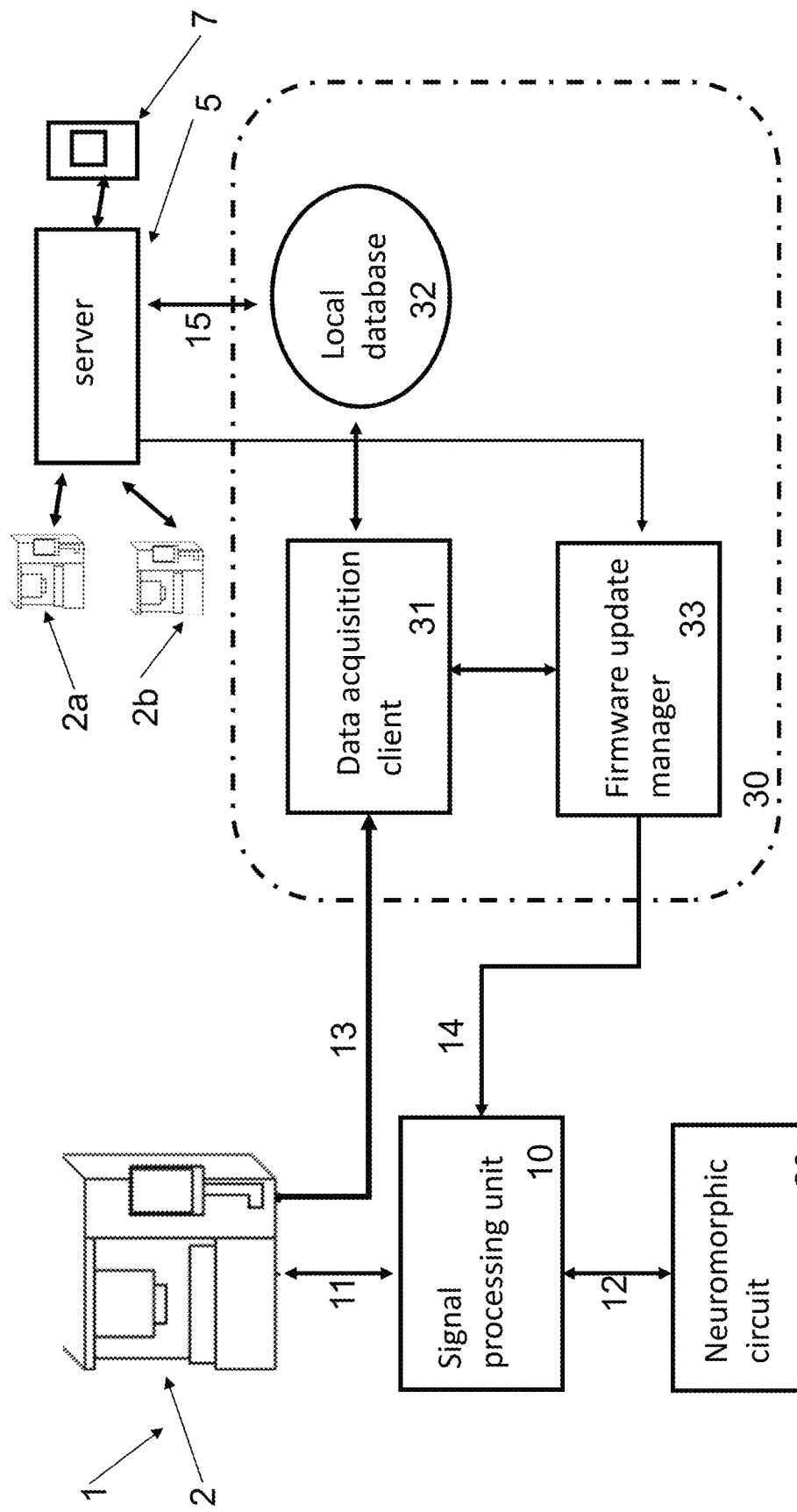
FIG. 2 illustrates a second embodiment of the system.
Figure 3:
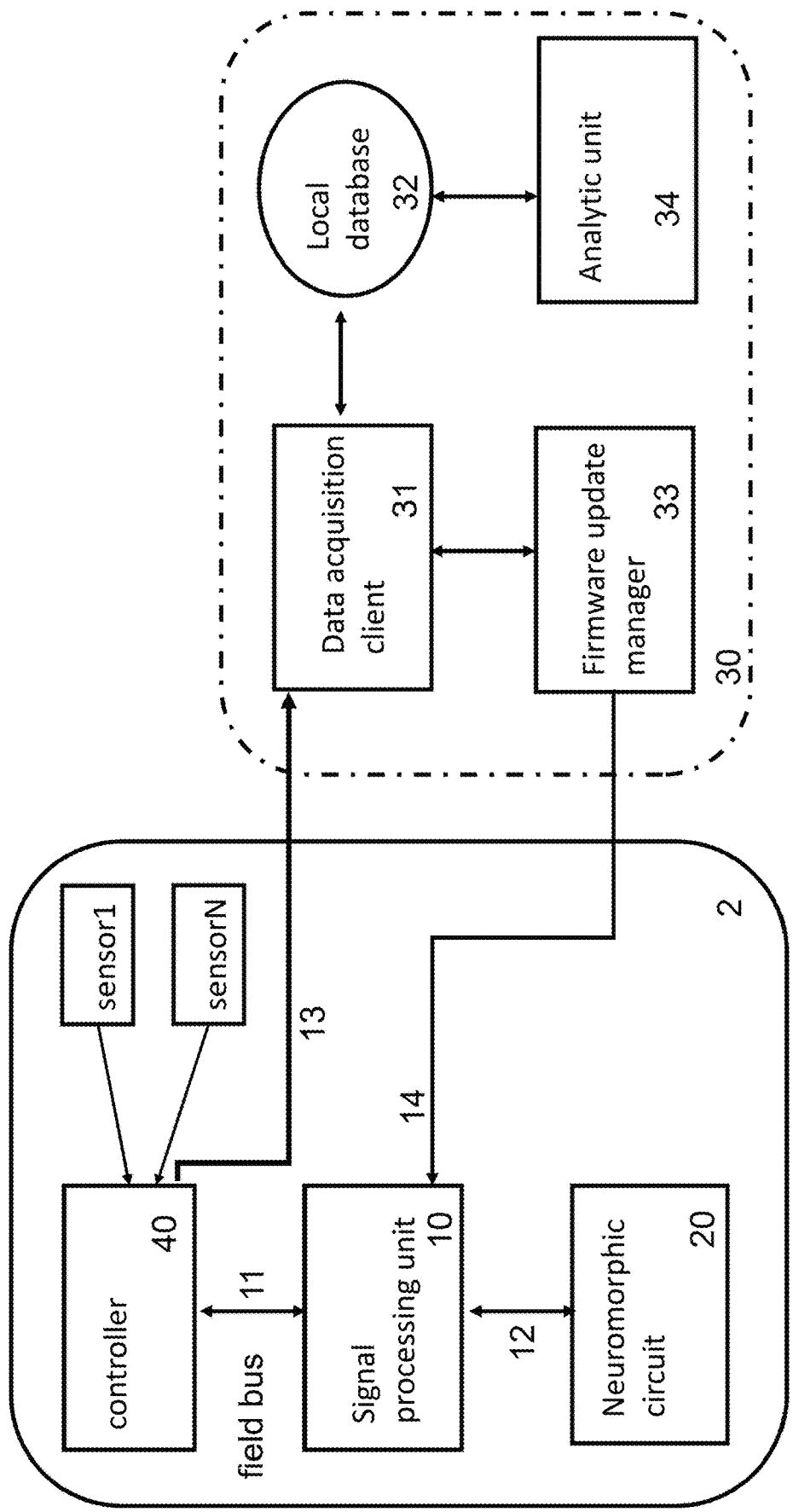
FIG. 3 illustrates a third embodiment of the system.

FIGS. 1, 2 and 3 illustrate three embodiments of the system. FIG. 4 shows one embodiment of implementation for machining a workpiece by an electrical discharge machine. However, the system can be applied in the different types of machine tool.

A signal-processing unit 10 is configured to receive raw data from a machine tool 2 through a first communication 11 and to prepare neuromorphic-circuit input data based on the received raw data. The neuromorphic circuit 20 is configured to receive the neuromorphic-circuit input data through a second communication 12 and predict the anomalies to determine anomaly data, which is sent back through the second communication to the signal-processing unit. The determined anomaly data is communicated to a controller embedded in the machine tool through the first communication such that the machine parameters can be adjusted to avoid defects occurred on the parts under machining. The anomalies serve as indicators of defects, which can occurred on the part under machining. In further, anomalies serve as indicators of defects of the machine tool.

The machining data and/or anomaly data can be sent to an edge module 30 through a third communication 13 or fourth communication 14 between the signal-processing unit and the edge module. A data acquisition client 31, a local database 32. A firmware update manager 33 and an analytic unit 34 are embedded in the edge module. The data acquisition client is configured to be able to directly communicate with the machine tool through the third communication and to the local database 32.

The data acquisition client receives raw data from the machine tool. In further, the determined anomalies can be communicated to the data acquisition client from the signal-processing unit.

A local database is provided to store status data including raw data, anomaly data and the machine parameters adjusted after a detection of anomaly, which can be accessed by an external device.

FIG. 1 illustrates one embodiment, in which an external communication device 6, such as a smart phone, a laptop can access the data form the local database through the fifth communication 15 and provide the data for the firmware update manager. In this example, the analytic unit 34 is installed in the edge module.

FIG. 2 illustrates another embodiment, in which a server 5 is connected to the edge module. A plurality of machine tools 2a, 2b, communication device 6 located for example in a shop floor can communicate with the server to obtain the data stored in the edge module. It is considerable to that the edge module is connected to the cloud. Through the cloud the machine tools in different locations can access the data stored in the edge module and can provide data to the clouds. In these examples, the analytic unit can be installed in the server or cloud.

FIG. 3 shows one embodiment, in which the signal-processing unit and the neuromorphic circuit are embedded in the machine tool 2 and the communication between the controller of the machine tool and the signal-processing unit is realized by a field bus for fast communication. A plurality of sensors are installed in the machine tool to perform the required measurements and provide the sensor data to the controller. The raw data including machine parameters and sensor data can be input to the signal-processing unit through the field bus. In further, a communication between the controller and the data acquisition client enables sending the status data including raw data and anomaly data to the edge module for storage.

FIG. 4 shows an experiment example of utilizing the system for EDM application. When a workpiece is machined by an EDM machine to produce a part, the anomalies of machining can cause the machined parts having defects and errors in quality. An EDM machine tool machines a square punch part made of steel with three passes. Each pass is servo-controlled differently by the machine tool.

The first experiment shows predicting an anomaly related to a defect named short line, which is a visible mark of the size about the wire diameter. The short line is normally as long as the part height. It can be a groove or a hill on the surface of the manufactured part and has a dimension of tens of micron meters. The raw data is the contamination ratio of the third pass, which is calculated by the controller of the machine tool. The signal-processing unit is configured to normalize the contamination ratio to a value between 0 to 1 and select the outliers, which are the samples having a value above a first threshold value. In this example, the first threshold value is 0.54. This is the value, for which 90% of the samples fall under. The outliers have a high risk of marking the part with short line. The first threshold value can be adjusted. A second threshold value is defined as a security measure to avoid the false positive detection. In this example, the second threshold value is 0.7. The feature in this example can be a value between the first threshold and the second threshold, namely, between 0.54 and 0.7. The anomaly data determined by the neuromorphic circuit is short line.

The second example illustrates detecting the anomaly related to a defect of large strip, which is a visible large mark of the size, which is several times larger than the wire diameter of the wire electrode. This defect starts for the same reasons as for the short line but maintains longer because of the short-circuit between the part and the wire electrode or deeply contaminated sparks. In order to detect this anomaly, three signals are input into the signal-processing unit as raw data, the spark discharge mean voltage, time duration ratio of the discharge voltage (TD ratio) and the low head injection pressure. While the first two signals are set machine parameters, the third signal is measured by a pressure sensor. The signal processing unit is configure to first normalize the values of all signals into a range between 0 and 1. For the feature extraction, a combined value, namely the product of the three signals is used.

Figure 5:
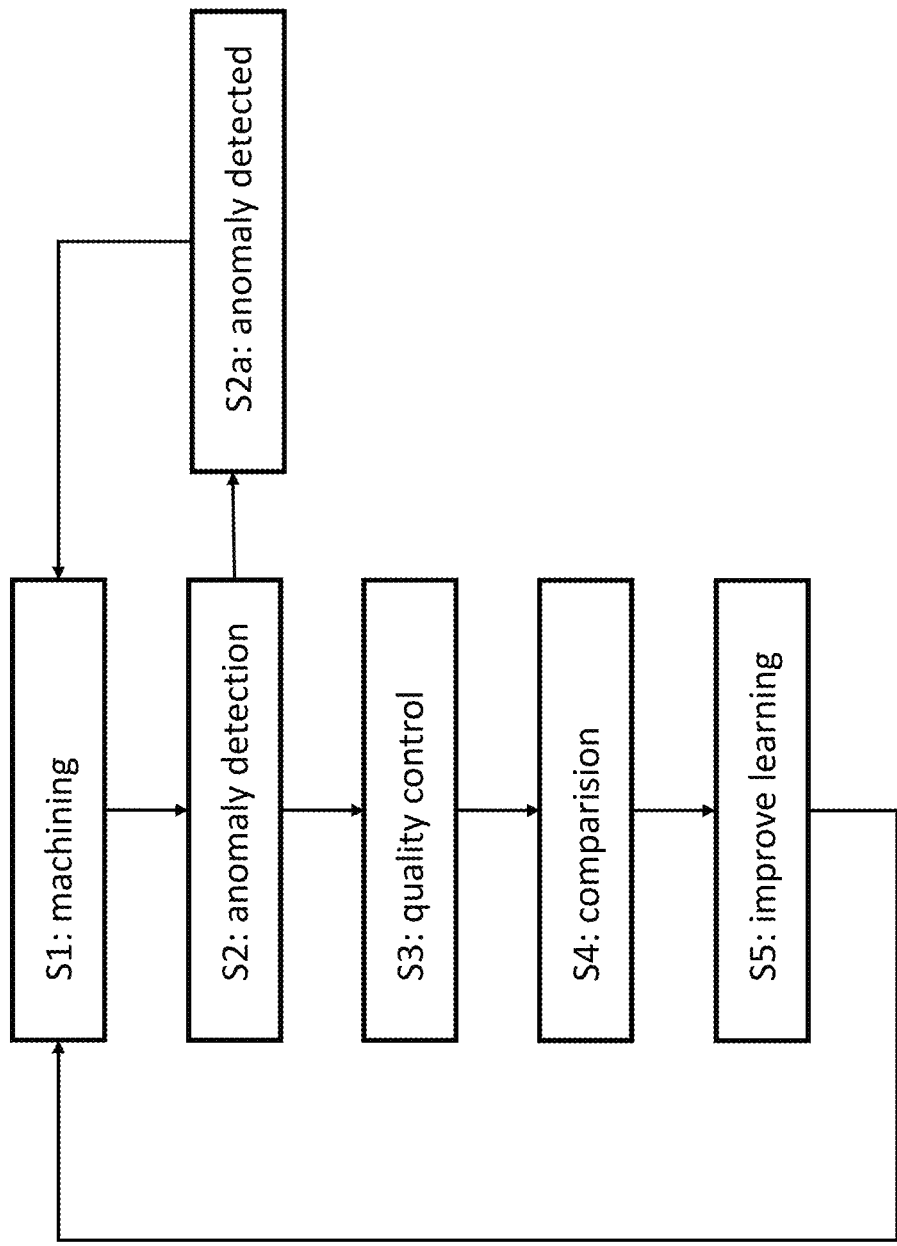
FIG. 5 Illustrates the steps of the method of the present invention.

FIG. 5 illustrates the steps of the method. The machining starts at the step S1. During the machining S2, anomaly detection is performed in real time. If an anomaly is predicted by the neuromorphic circuit, this information is sent back to the machine tool through the signal-processing unit, such that the corresponding actions can be taken to avoid the anomaly. The machining can be interrupted or the machine parameters can be adjusted. In step S3, a quality control can be performed after the finishing of the machining or during the interruption of the machining. From the quality control, the quality data of the machined or partially machined part can be obtained and compared with the anomaly data retrieved during the machining. If additional information, such as new anomalies are obtained during the quality control, the additional information can be used to build new training data to improve the learning of the neuromorphic circuit. By this way, the detection precision can be further improved as shown in step 5 S5.

LIST OF REFERENCES 1 system
2, 2a, 2b machine tool
3 cloud services
4 mobile device
5 shopfloor server
6 communication device
7 mobile device
10 signal processing unit
11 first communication
12 second communication
13 third communication
14 fourth communication
15 fifth communication
20 neuromorphic circuit
30 edge module
31 date acquisition client
32 local database
33 firmware update manager
34 analytic unit
40 controller

The invention claimed is:

1. A system for predicting anomalies of machining such as the anomalies causing a defect on a part machined by a machine tool, comprising:
    a signal-processing unit configured to acquire raw data including sensor data and machining parameters from a machine tool and to process the raw data to neuromorphic-circuit input data including features extracted by the signal-processing unit from the raw data;
    a neuromorphic circuit connected to the signal-processing unit configured to build a neural network on an integrated circuit, wherein the neural network is trained by training data and the trained neural network is configured to determine anomaly data describing anomalies of the machining in response to the neuromorphic-circuit input data, in particular to the features, wherein each training data set includes a plurality of features and a corresponding anomaly; and
    a controller configured to receive the determined anomaly data from the signal-processing unit and to determine at least one action, which can be taken to overcome the determined anomalies, wherein the signal-processing unit is configured to select from the raw data a different combination of data required to determine the anomalies related to different types of machining.

2. The system according to claim 1, wherein the raw data is obtained during the machining, in particular, without interrupting the machining.

3. The system according to claim 1, wherein the controller is configured to receive the determined anomaly data and to adjust the machining parameters in response to the determined anomaly data.

4. The system according to claim 1, wherein the neuromorphic circuit is an integrated circuit and is located in the proximity of the machine tool, preferably the neuromorphic circuit is embedded in the machine tool.

5. The system according to claim 1, wherein the anomaly data include anomalies indicating a defect of a part machined by a machine tool, and/or defects of the machine tool during operation, in particular the anomaly data comprises the type of the anomalies and the position of the anomalies on the part and/or on the machine tool.

6. The system according to claim 3, wherein the system further comprises an edge module configured to receive and store one or more of the raw data, anomaly data, and the adjusted machining parameters.

7. The system according to claim 6, wherein anomalies for one of the following applications can be determined: electro discharge machining, milling, laser machining, and additive manufacturing.

8. The system according to claim 1, wherein the neuromorphic circuit is configured to store different knowledge spaces for anomaly detection of different machining, wherein the knowledge space defines the correlation between the features provided to the neuro-morphic circuit and the anomaly data.

9. The system according to claim 6, wherein an analytic unit is included in the edge module and configured to receive part-quality data, which is obtained by inspecting the produced part and to determine optimized training data based on the part-quality data.

10. The system according to claim 9, wherein the part-quality data is obtained by inspecting a machined part using an optical device.

11. The system according to claim 9, wherein the optimized training data is used to update the knowledge space stored in the neuromorphic circuit.

12. The system according to claim 6, wherein the edge module is configured to communicate with a cloud server.

13. A machine tool for machining a part comprising the system according to claim 1.

14. A method for predicting anomalies of machining, including anomalies causing a defect on a part machined by a machine tool, the method comprising:
    acquiring raw data by a signal processing unit, the raw data including sensor data and machining parameters from a machine tool and processing the raw data to neuromorphic-circuit input data including features extracted by the signal processing unit from the raw data;
    determining anomaly data related to defects on the part, which is being machined by the machine tool, and/or the defects of the machine tool during operation by a neuro-morphic circuit connected to the signal-processing unit and is configured to build a neural network on an integrated circuit, wherein the neural network is trained by the training data including a plurality of data sets with a plurality of features and a corresponding anomaly, wherein the neural network is configured to determine anomaly data describing anomalies of the machining in response to the neuromorphic-circuit input data, in particular features; and
    sending the determined anomaly data by the signal-processing circuit to a controller and determining by the controller at least one action, which can be taken to avoid the determined anomalies, wherein the signal-processing unit is configured to select from the raw data a different combination of data required to determine the anomalies related to different types of machining.

15. The method according to claim 14, further comprising:
- starting machining and performing the anomaly detection according to claim 14;
- inspecting the part after the machining to generate quality data of the machined part;
- comparing the generated quality data with the anomaly data generated during the machining; and
- generating optimized training data to train the neuromorphic circuit.

* * * * *